Feb. 10, 1959 D. F. FLOWERS 2,872,787
FLUID OPERATED POWER LIFTING UNIT FOR DUMPING VEHICLES
Filed July 12, 1954 8 Sheets-Sheet 1

Fig. 1.

INVENTOR.
DANIEL F. FLOWERS
BY
ATTYS.

Feb. 10, 1959 D. F. FLOWERS 2,872,787
FLUID OPERATED POWER LIFTING UNIT FOR DUMPING VEHICLES
Filed July 12, 1954 8 Sheets-Sheet 2

INVENTOR.
DANIEL F. FLOWERS
BY
Mason, Porter, Diller T Stewart
ATTYS.

Fig. 4.

INVENTOR.
DANIEL F. FLOWERS

Fig. 5.

Feb. 10, 1959 D. F. FLOWERS 2,872,787
FLUID OPERATED POWER LIFTING UNIT FOR DUMPING VEHICLES
Filed July 12, 1954 8 Sheets-Sheet 8

Fig. 8.

INVENTOR.
DANIEL F. FLOWERS
BY
ATTYS.

United States Patent Office 2,872,787
Patented Feb. 10, 1959

2,872,787
FLUID OPERATED POWER LIFTING UNIT FOR DUMPING VEHICLES

Daniel Fort Flowers, Findlay, Ohio

Application July 12, 1954, Serial No. 442,495

7 Claims. (Cl. 60—97)

This invention relates to new and useful improvements in a power lifting unit which is particularly adapted for tilting the body of a dump vehicle for discharging its load.

An object of the invention is to provide a fluid actuated power lifting unit of the telescoping cylinder type with a booster cylinder which cooperates with the piston to increase the effective lifting power of the unit for a given fluid pressure.

A further object of the invention is to provide a power lifting unit of the above booster type with means wherein the booster cylinder operates to increase the lifting power of the unit during the first part of the lifting stroke and wherein the booster cylinder operates to cushion the movement of the lifting piston at the end of its lifting stroke.

These and other objects will in part be obvious and will in part be hereinafter more fully disclosed.

In the drawings which show by way of illustration, one embodiment of the invention.

The invention is directed to a power lifting unit of the type used to tilt the bodies of dump vehicles. In dumping vehicles the force required for dumping is greatest at the beginning of the dumping stroke. As the body tilts to steeper angles the force required to tilt the body drops rapidly for three reasons; first, some of the load discharges from the vehicle body; second, the center of gravity of the remaining load and of the body approaches closer to a position directly over the trunnion or pivot about which the body tilts; and third, as the down folding door opens the effect of its weight and that of the load upon it acts through the door operating mechanism to assist in tilting the body. The net result is that by the time the body has tilted to an angle of 20°, the force required has been reduced to about one-third of that required to initiate the tilting movement. Hence, for a given fluid pressure, a power cylinder needs more than twice as much effective piston area for that part of the stroke used to tilt the body the first 20°. As for the rest of the dumping stroke the improved power lifting unit accomplishes this result in a very effective manner.

Figure 1:
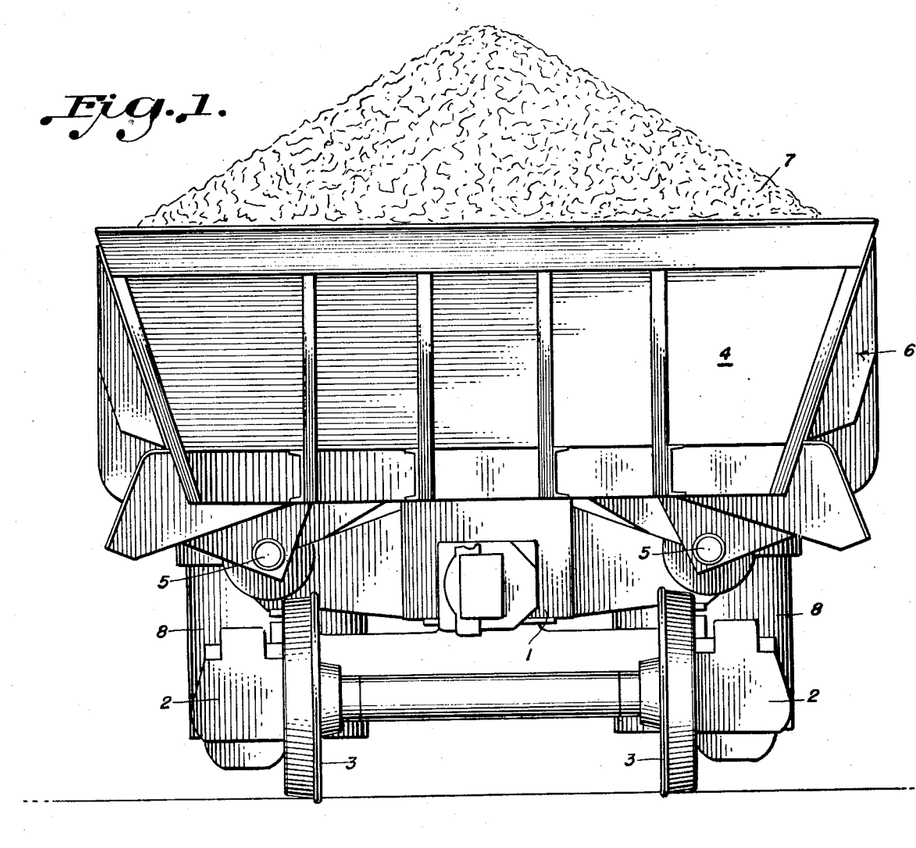
Figure 1 is an end view of a loaded air dump vehicle embodying the improved power lifting unit for tilting the body selectively to one side or the other for discharging the load.

Referring to the illustrated embodiment of the invention, Figure 1 shows an end view of an air dump vehicle of conventional body design equipped with the new power tilting unit. The vehicle is equipped with an underframe 1 resting on a conventional railroad type of trucks 2 for railroad use. The wheels 3 are provided with flanges. Mounted on the underframe 1 is a body 4 arranged so as to be tilted to either side about fulcrum trunnions 5, 5. The body is provided with hinged down folding doors 6 and incorporates a door controlling mechanism which serves to open the door on the side towards which the body is tilted for dumping. In this Figure 1 the vehicle is loaded and the material therein is indicated at 7. The power lifting units are all of like construction. Preferably there are two units on each side of the vehicle. The power lifting units are operated by fluid pressure, preferably air pressure. The power lifting units in the manner of tilting the body are more clearly shown in Figures 2 and 3. The outer cylinder 8 of the power lifting unit is provided with trunnions pivoted to the underframe at 9 and each unit includes a piston and a piston rod and the rod is connected to the body by a pin 10 passing through the body floor beams 11 underneath the body floor plate 12. In these two Figures 2 and 3 there is illustrated a typical dumping cycle with the dump body at an angle of 20° in Figure 2 and in full dump position in Figure 3.

Figure 2:
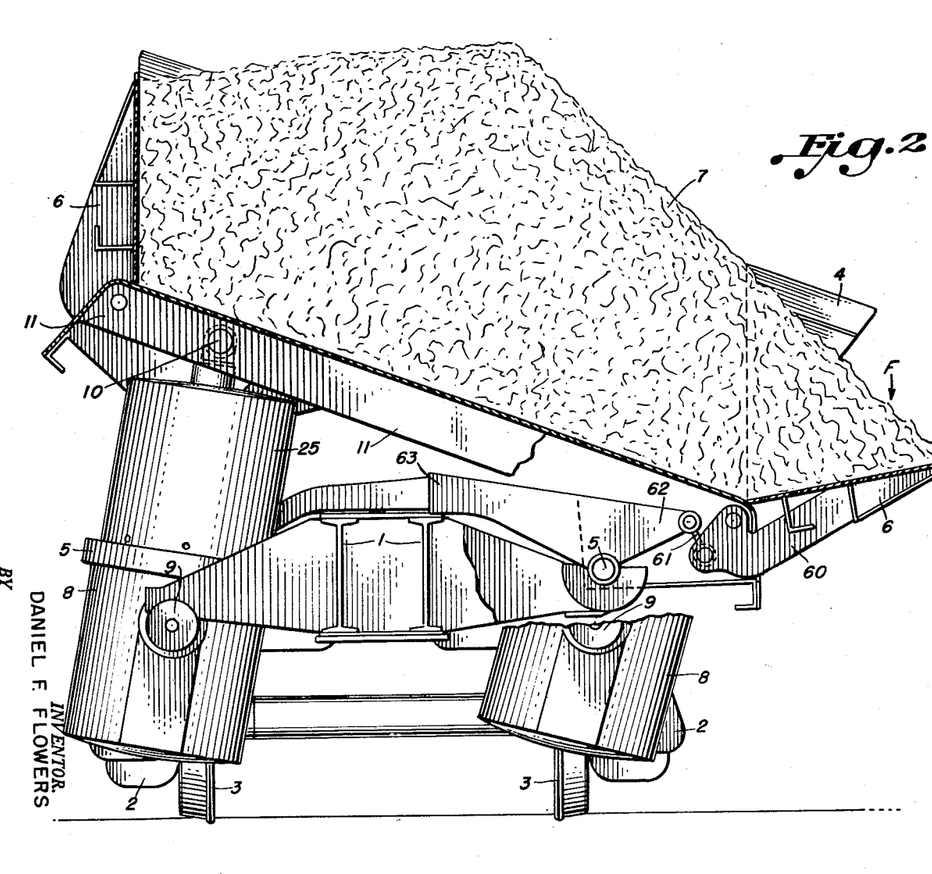
Figure 2 is a vertical cross section at the center of the vehicle showing the position of the body members and load when the body is tilted to an angle of 20°.
Figure 3:
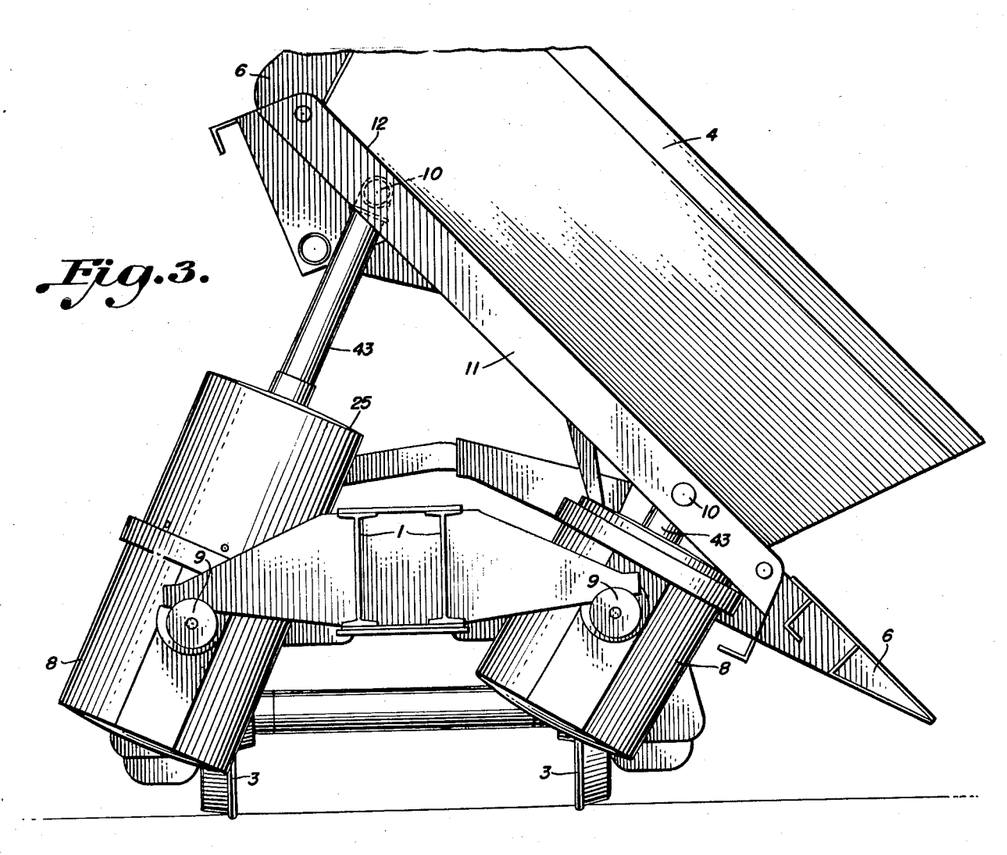
Figure 3 is a view similar to Figure 2 but showing the body tilted to the full extent and the load discharged therefrom.

From these figures it will be seen that the force required to dump a loaded car decreases quite rapidly because the center of gravity of the body and load approaches the vertical plane through the fulcrum about which the body is tilted. The shifting of the load onto the down folding door causes a reaction in the door mechanism further tending to tilt the vehicle toward dumping position and some of the load leaves the vehicle before full dump position is reached. For a typical fully loaded dump vehicle with a down folding door the dumping force required at the time the body has been tilted 20° is only one-third of that required to initiate dumping.

Figure 2 shows how the door operating mechanism assists the power lifting units in tilting the dump body. The door 6 is shown as supported by a hinge 60 connected by a door link 61 to the door operated lever 62 which pivots about the fulcrum pivot 5. The weight of the load on the door acts through the hinge 60, the door link 61 and a door operating lever 62 which is pressed against the underframe 1 at the end 63 of said door operating lever. The force F on the door is in such a direction as to assist the power units 8 in tilting the body about the fulcrums 5. This force F is at a maximum as the door approaches horizontal position as shown in Figure 2, and for maximum effectiveness of the improved power lifting units, the door operated linkage should be designed so that the door 6 is approaching the horizontal position when the body of the car has been tilted 20°.

Previous dumping cylinders have been constructed in such a way that the piston area subject to air pressure remains about the same during the entire dumping cycle. The improved power tilting units are much more efficient in this respect in that the effective piston area is almost twice as great during the first half of the power stroke as it is during the last half when so much less force is required.

In Figures 4 to 8 there is shown in detail one of the power lifting units and how the advantages referred to are accomplished. These power lifting units are all of the same structure and the description of one will apply to the others. Each power unit consists of a power cylinder 13 to which is attached a bottom 14. For pivotally supporting the unit on the underframe, trunnions 15, 15 are provided which pass out through reenforcements 15′, 15′ and are connected to the outer cylinder 13. At the top of the cylinder 13 is attached a flange 16 and a packing ring retainer 17. Within the retainer ring is a gasket retainer ring 18 which is recessed at 19 so as to receive a fluid packing 19a which as shown is a rubber O ring. Above the packing retaining ring 18 is placed a dirt scraping ring 20. Bolts 22 pass through the retainer 21 and the flange 16 and hold the retainer 18 in place.

Figure 4:
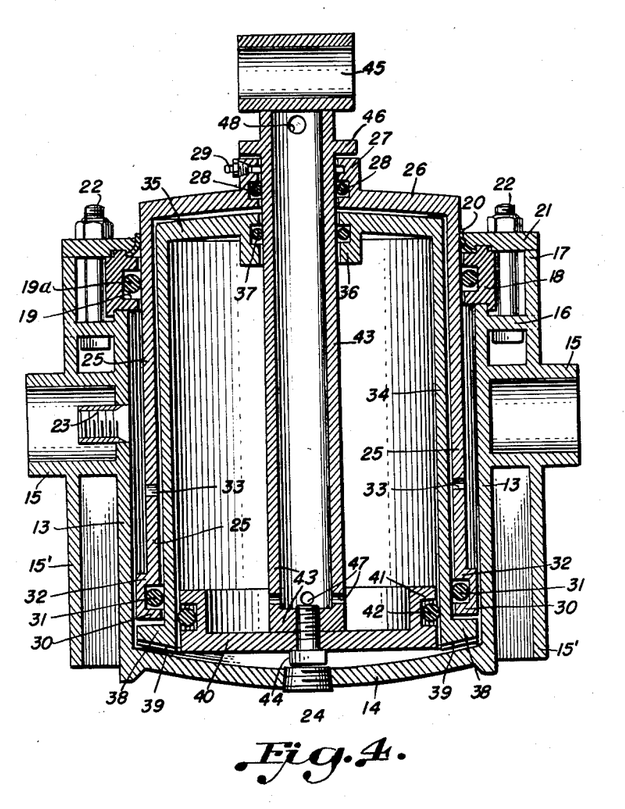
Figure 4 is a vertical sectional view through one of the power lifting units embodying the improvements and with the lifting cylinders and piston positioned for loading and transporting.

A pipe connection 23 extends through the center of one of the cylindrical trunnions 15 and through this pipe connection fluid under pressure, preferably air, is directed into the cylinder 13. Telescoping inside of the outer cylinder 13 is a booster cylinder 25 which has a head 26 attached thereto at the upper end of the cylinder. At the center of the cylinder head 26 there is a neck portion 27 in which is a recess which holds the booster cylinder neck packing 28. The purpose of the booster cylinder neck packing 28 is to prevent the passage of fluid under pressure from below the booster cylinder head 26 to the atmosphere. A lubricant fitting 29 is provided for admitting oil to lubricate the packing 28. At the open lower end of the booster cylinder 25 is a packing retaining ring 30 which has a recess in its inner face to hold a packing 31. This lower packing 31 is used to provide a fluid tight seal between the booster cylinder and an inner cylinder 34. The packing ring 30 is provided with a shoulder 32 which bears against the lower edge of the packing ring 18 when the booster cylinder is in extended position. This packing ring 30 is also dimensioned on its outer diameter so as to be guided in the outer cylinder 13. In the booster cylinder 25 there are drilled booster cylinder ports 33 located at a sufficient distance above the retaining shoulder 32 so that the ports 33 are exposed above the scraping ring 20 when the shoulder 32 is in contact with the packing ring 18. These ports 33 allow actuating fluid to pass so as to equalize pressure between the inside and outside of the booster cylinder 25. The ports also have another purpose which will be described later.

Inside of the booster cylinder 25 is an inner cylinder 34. This inner cylinder 34 has an inner cylinder head 35 at the center of which is an inner cylinder neck 36 which neck has a recess to receive a packing 37. At the bottom of the inner cylinder 34 is a cylinder guiding flange 38 which serves to support the inner cylinder 34 on the outer cylinder bottom 14 and also to guide the bottom of the inner cylinder as it rises inside of the power cylinder 13. Actuating fluid under pressure can pass between the outer cylinder and the inner cylinder guide flange 38 as the flange is provided with passages 39 for this purpose.

Within the inner cylinder 34 is a piston 40 at the circumference of which is a packing retaining ring 41 in which there is a recess to hold a packing 42. The packing 42 serves as a moving seal to prevent fluid under pressure from flowing around the piston 40. This packing may be a rubber O ring or any other suitable packing.

A piston rod 43 is connected to the piston 40, preferably by a cap screw 44 threaded into the piston rod at the closed lower end thereof. At the top of the piston rod 43 is attached a piston rod eye 45 through which the pin 10 passes when the power unit is attached to the dump body. Just below the eye 45 is a collar 46 which is attached to the piston rod. This collar 46 is contacted by the booster neck 27 during the first part of the piston stroke and is the means by which the force exerted by fluid pressure under the booster cylinder head 26 is transferred to the piston rod 43 (see Fig. 5). The piston rod 43 is so dimensioned as to have a moving fluid tight fit with the booster cylinder neck packing 28 and the inner cylinder neck packing 37. The clearance between the piston rod 43 and the inner cylinder neck 36 could be small enough so that further means of sealing against fluid flow are unnecessary. Similarly, with small enough clearance between the booster cylinder neck 27 and the piston rod 43, the packing 28 can be omitted. With the booster cylinder neck packing omitted the clearance around the rod 43 during the last part of the power cylinder stroke serves as a vent area supplementary to that of the booster cylinder ports 33. This additional vent area in some cases is desirable.

It is necessary to vent the fluid above piston 40 as it rises inside of the cylinder 34 and for this purpose the piston rod adjacent the lower end thereof is provided with vent openings 47. The piston is hollow and there are vent openings 48 provided just above the piston rod collar 46. These vent openings 48 also serve as an opening for admission of lubricant into the cylinder above the piston.

*Operation*

Figure 5:
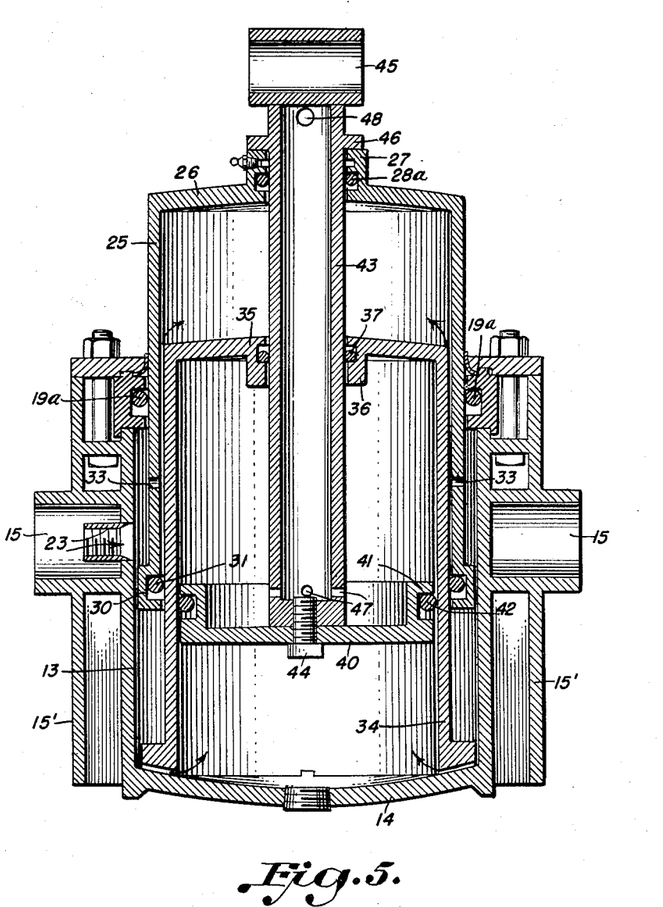
Figure 5 is a view of the lifting unit with the cylinders and piston moved to a position where the body is tilted through an angle of 10°.

The operation of this fluid actuated power unit can best be understood by reference to Figures 4 to 8 which show the successive positions of the internal parts of the power unit. With the body positioned as shown in Figure 1 and the power unit parts positioned as shown in Figure 4 the body will be held in position for loading and in position for transport. When it is desired to tilt the body fluid pressure is directed through the pipe connection 23 into the chamber between the booster cylinder and the outer cylinder. The fluid under pressure will pass through the port 33 into the space between the inner cylinder and the booster cylinder and thence into the chamber between the booster head 26 and the inner cylinder head 35. Fluid pressure will also pass freely between the power cylinder 13 and the shoulder 32 and the flange 38 and thence through the recesses 39 into the chamber beneath the piston head. This fluid pressure will raise the piston 40 and will simultaneously raise the booster cylinder 25, the inner cylinder 34 remaining in contact with the outer cylinder bottom 14. The booster cylinder will contact the piston rod collar 46 and will transmit its power to the piston rod so that the effective area operating upon the piston to raise the same is that of the inner surface of the booster head 26 and the undersurface of the piston. This provides a maximum power lift for the piston rod. When this power lifting unit is applied for the tilting of the body of a dump car the body is tilted through approximately 10° when the parts are positioned as shown in Figure 5. The continued application of the fluid pressure will raise the booster cylinder to a point where the shoulder 32 contacts with the packing retaining ring 18. This is the limit of outward movement of the booster cylinder. When this point is reached the ports 33 are slightly above the dirt scraping ring 20 and, therefore, the chamber between the booster head 26 and the cylinder head 35 will be slowly vented, see Fig. 6. Meanwhile the piston has moved upwardly with the booster cylinder.

Figure 6:
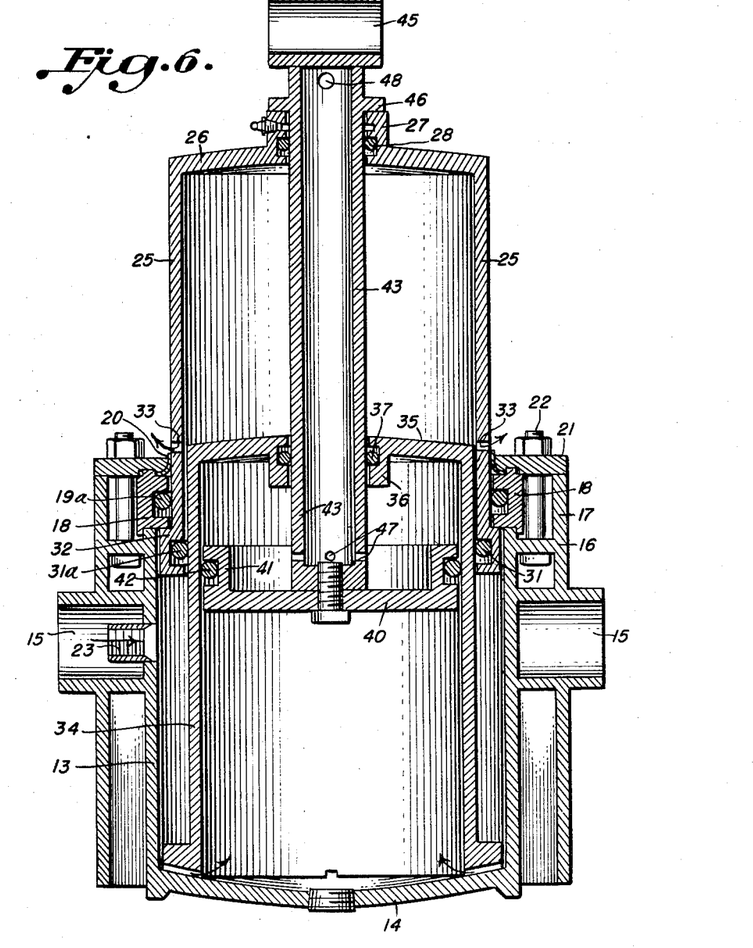
Figure 6 is a view similar to Figure 5 with the lifting unit cylinders in the position where the body has been tilted to 20°.
Figure 7:
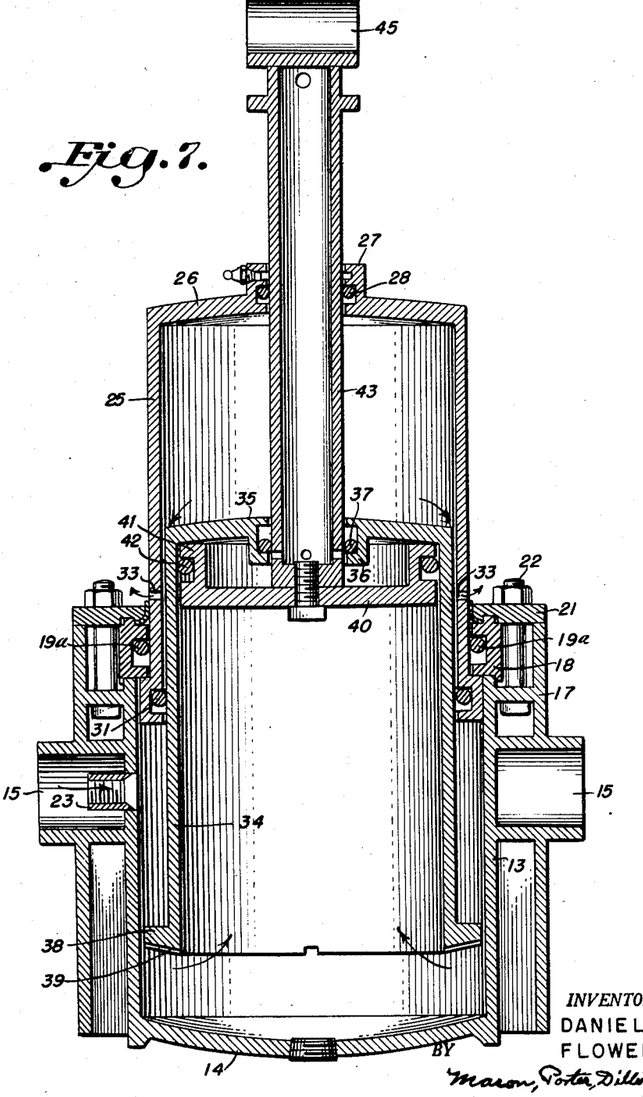
Figure 7 is a view similar to Figure 6, but showing the position of the parts when the body is tilted to 30°.

When the parts are positioned as shown in Figure 6, the body has been tilted to approximately 20°. Full pressure is thus applied under both the piston 40 and the booster head 26 and the total effective piston area subject to pressure is the sum of the areas of the piston 40 and the booster cylinder head 26. The force for given fluid pressure exerted on the dump body to tilt it through this angle of 20° is almost twice that available in the conventional telescoping power cylinders in which fluid pressure is exerted only on the piston area. Hence the fluid pressure necessary to initiate dumping is a little more than half that required if no booster cylinder 25 were present.

The booster cylinder head 26 transmits force to the piston rod collar 46 only until the retaining shoulder 32 comes in contact with the packing retaining ring 18. At this time the booster cylinder ports 33 have passed the cylinder fluid packing 19a and no more fluid under pressure can enter the booster cylinder ports 33 from the inside of the outer cylinder 13.

Instead the fluid between the inner cylinder head 35, and the booster cylinder head 26 is vented through the ports 33 to the outside of the cylinders. Meanwhile the dumping force available against the piston is only that due to the difference in pressure below and above the piston 40. Hence the effective piston area is reduced almost in half at the end of the booster cylinder stroke. Since, however, the total forces required to continue dumping a loaded car with the body tilted to 20° is only one-third of that required at the start the pressure necessary to tilt the body past 20° is only about two-thirds that required to initiate dumping.

A second stage in dumping begins at the position shown in Figure 6 where the body has been tilted to an angle of 20°. During this stage the piston 40 rises in the cylinder 34 until the piston packing ring 41 contacts the inner cylinder head 35. Meanwhile, fluid under pressure above the inner cylinder head 35 can escape through the booster cylinder ports 33. The final stage of dumping begins when the piston packing ring 41 contacts the inner cylinder head 35. Fluid under pressure continues to enter through the pipe connection 23 as the piston 40 rises. The fluid between the cylinder head 35 and the booster head 26, as has already been noted, is vented to the outside through the ports 33. This fluid is under some pressure due to the rapidly decreasing volume of the chamber between the two heads. The pressures rise or fall above the inner cylinder head 35 depending on the rate at which the body is dumping and the size of the ports 33. The net pressure on the piston 40 is thus the difference between the pressure below the piston and that retained above the inner cylinder head 35. At the stage shown in Figure 7 the body is tilted through substantially 30° and the load in the car is leaving rapidly and the lifting unit force required falls off quickly. If dumping is by air which is compressible, the force required may fall off more rapidly than the pressure of the expanding air in the power cylinders 8. The fall of the body is accelerated and there is likely to be an impact at the end of the dumping stroke. With this improved power lifting unit, however, the fluid above the inner cylinder head 35 can vent off only at limited rate and the pressure above the inner cylinder head 35 builds up to act as a cushion to control dumping speed and reduce the shock of dumping. This cushioning effect provided during the last part of the power stroke by using some of the fluid introduced during the first part of the power stroke is a very valuable feature in preventing derailment due to excessive dumping shock, particularly in dumping materials which tend to leave the body in one large mass.

Figure 8:
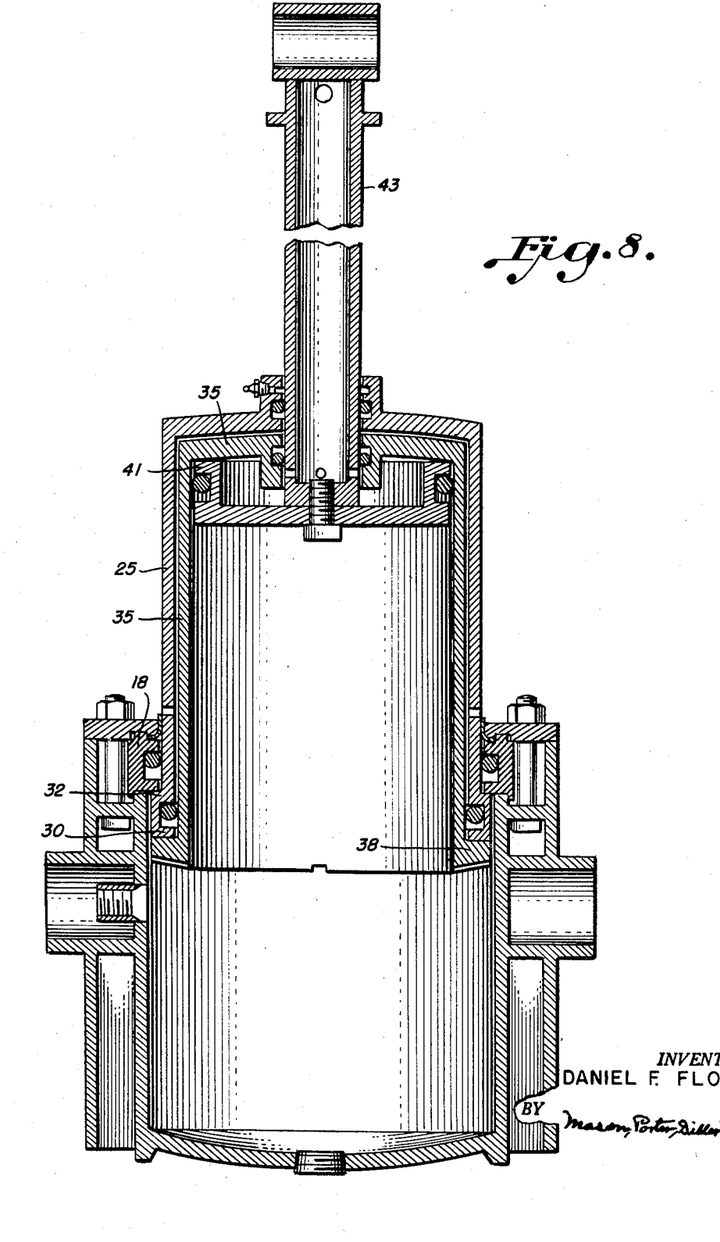
Figure 8 is a view similar to Figure 7 with the cylinders and piston positioned when the body has been tilted to the full tilting position which is preferably about 46°.

Figure 3 shows the car body in full dumping position and Figure 8 shows the position of the parts of the power lifting unit at this time. The inner cylinder 34 is completely telescoped into the booster cylinder 25. The length of the stroke is definitely limited by contact of the piston packing retaining ring 41 and the inner cylinder head 35 together with the contact between the inner cylinder guiding flange 38, booster cylinder retaining ring 30 and the outer cylinder retaining ring 18.

From the above it will be noted that a power lifting unit has been devised which is particularly adapted for the tilting of the body of a dump vehicle to discharge its contents wherein there is increased power at the beginning of the dumping stroke without increasing the outside diameter of the usual power cylinder and that the power for tilting the body decreases as the load moves out onto the opening door at the side of the dumping and that the actuating fluid in the improved car unit serves as a cushioning means at the end of the dumping stroke.

It is obvious that numerous changes in the details of construction may be made without departing from the spirit of the invention as defined in the appended claims.

I claim:

1. A fluid operated power lift comprising an outer cylinder, an inner cylinder telescoping therein, a booster cylinder telescopingly disposed between said inner and outer cylinders, said inner cylinder and said booster cylinder having closure heads at the outer ends thereof, a piston within said inner cylinder, a piston rod attached to said piston and extending through both of said heads, said piston rod having a means fixed thereto against which the booster head bears while being moved outwardly, means for venting the chamber between the piston and the head of the inner cylinder, and means for simultaneously directing fluid pressure against said piston and between said heads for forcibly moving the piston rod and the booster head outwardly on the power stroke.

2. A fluid operated power lift comprising an outer cylinder, an inner cylinder telescoping therein, a booster cylinder telescopingly disposed between said inner and outer cylinders, said inner cylinder and said booster cylinder having closure heads at the outer ends thereof, a piston within said inner cylinder, a piston rod attached to said piston and extending through both of said heads, said piston rod having a means fixed thereto against which the booster head bears while being moved outwardly, means for venting the chamber between the piston and the head of the inner cylinder, means for simultaneously directing fluid pressure against said piston and between said heads for forcibly moving the piston rod outwardly on the first part of the piston power stroke, and means for cutting off the fluid pressure supply to the chamber between the heads and venting said chamber to the atmosphere during the latter part of the piston power stroke.

3. A fluid operated power lift comprising an outer cylinder, an inner cylinder telescoping therein, a booster cylinder telescopingly disposed between said inner and outer cylinders, said inner cylinder and said booster cylinder having closure heads at the outer ends thereof, a piston within said inner cylinder, a piston rod attached to said piston and extending through both of said heads, and means for simultaneously directing fluid pressure against said piston and between said cylinder heads in order to move both the piston and the closure head of the booster cylinder in the same direction during the power stroke of said lift.

4. A fluid operated power lift comprising an outer cylinder, an inner cylinder telescoping therein, a booster cylinder telescopingly disposed between said inner and outer cylinders, said inner cylinder and said booster cylinder having closure heads at the outer ends thereof, a piston within said inner cylinder, a piston rod attached to said piston and extending through both of said heads, means for simultaneously directing fluid pressure against said piston and between said cylinder heads in order to forcibly move both the piston and the closure head of the booster cylinder during the first part of the piston power stroke, and means for cutting off the fluid pressure supply to the chamber between the heads and venting said chamber to a region of lower pressure during the latter part of the piston power stroke.

5. A fluid operated power lift comprising an outer cylinder, an inner cylinder telescoping therein, a booster cylinder telescopingly disposed between the inner and outer cylinders, said inner cylinder and the booster cylinder having closure heads at the outer ends thereof, a piston within said inner cylinder, a piston rod attached to said piston and extending through both heads, said piston rod having means contacted by the booster cylinder when moved outwardly, means for venting the chamber between the piston and the head of the inner cylinder, means for simultaneously directing fluid pressure against the piston and between the heads during the first part of the outward movement, and means for cutting off the fluid pressure supply to the chamber between the heads and venting said chamber to the atmosphere during the remainder of the said outward movement, said piston contacting the inner side of the head of the inner cylinder and moving the same outwardly into the booster cylinder on the final portion of the said movement, said venting means for said chamber being restricted whereby the movement of the inner cylinder into the booster cylinder is retarded and the final movement cushioned.

6. A fluid operated power lift comprising an outer cylinder, an inner cylinder telescoping therein, a booster cylinder telescopingly disposed between the inner and outer cylinders, said inner cylinder and the booster cylinder having closure heads at the outer ends thereof, a piston within said inner cylinder, a piston rod attached to said piston and extending through both heads, said piston rod having means contacted by the booster cylinder when moved outwardly, means for venting the chamber between the piston and the head of the inner cylinder, said outer cylinder having trunnions on which the power unit is supported, a pipe connection to said outer cylinder for supplying fluid under pressure to the chamber between the outer cylinder and the booster cylinder and to the chamber beneath the piston, said booster cylinder having ports extending through the wall thereof for supplying fluid under pressure to the chambers between the heads of the booster and inner cylinders, said ports in the booster cylinder passing out of the outer cylinder and connecting the chamber between the heads to the atmosphere when the booster cylinder has traversed a predetermined part of its outward movement.

7. A fluid operated power lift comprising an outer cylinder, an inner cylinder telescoping therein, a booster cylinder telescopingly disposed between the inner and outer cylinders, said inner cylinder and the booster cylinder having closure heads at the outer ends thereof, a piston within said inner cylinder, a piston rod attached to said piston and extending through both heads said piston rod having means contacted by the booster cylinder when moved outwardly, means for venting the chamber between the piston and the head of the inner cylinder, said outer cylinder having trunnions on which the power unit is supported, a pipe connection through one trunnion to said outer cylinder for supplying fluid under pressure to the chamber between the outer cylinder and the booster cylinder and to the chamber beneath the piston, said booster cylinder having ports extending through the wall thereof for supplying fluid under pressure to the chambers between the heads of the booster and inner cylinders, said ports in the booster cylinder passing out of the outer cylinder and connecting the chamber between the heads to the atmosphere after the booster cylinder has traversed a predetermined part of its outward movement, said ports being restricted so that the fluid ejected from the chamber between the heads by the movement of the inner cylinder into the booster cylinder will retard the advance of the piston and finally cushion the stopping thereof.

References Cited in the file of this patent
UNITED STATES PATENTS

| | | |
|---|---|---|
| 1,548,182 | Burgin | Aug. 4, 1925 |
| 1,972,042 | Flowers | Aug. 28, 1934 |
| 2,634,587 | Ptak | Apr. 14, 1953 |
| 2,676,573 | Abbe | Apr. 27, 1954 |